United States Patent
Nicosia et al.

(10) Patent No.: US 6,729,515 B2
(45) Date of Patent: May 4, 2004

(54) LATCHING ASSEMBLY

(75) Inventors: Tony Nicosia, Brookfield, WI (US); Cornelius J. McDaid, Dorchester, MA (US); John D. Fiegener, Mendon, MA (US)

(73) Assignee: Harley-Davidson Motor Company Group, Inc., Milwaukee, WI (US)

(*) Notice: Subject to any disclaimer, the term of this patent is extended or adjusted under 35 U.S.C. 154(b) by 169 days.

(21) Appl. No.: 10/191,384

(22) Filed: Jul. 8, 2002

(65) Prior Publication Data

US 2002/0175543 A1 Nov. 28, 2002

Related U.S. Application Data

(63) Continuation of application No. 09/572,735, filed on May 17, 2000, now Pat. No. 6,443,344.

(51) Int. Cl.[7] .................................................. B62J 11/00
(52) U.S. Cl. ........................ 224/413; 70/18; 224/431; 292/302; 292/341.15; 403/327; 403/328
(58) Field of Search ................................. 224/413, 430, 224/431; 280/202; 292/302, 341.15; 70/18, 38 R, 58, 59; 403/109.3, 165, 327, 328

(56) References Cited

U.S. PATENT DOCUMENTS

| | | | |
|---|---|---|---|
| 2,313,712 A | 3/1943 | Jacobi | |
| 3,529,451 A | 9/1970 | McOsker et al. | |
| 3,826,114 A | 7/1974 | Emerson | |
| 4,032,189 A | 6/1977 | Benavente et al. | |
| 4,522,442 A | 6/1985 | Takenaka | |
| 4,679,806 A | 7/1987 | Gingline | |
| 4,759,580 A | 7/1988 | Berklich, Jr. et al. | |
| 4,773,693 A | 9/1988 | Premji et al. | |
| 4,810,162 A | * 3/1989 | Foster .................... | 403/327 |
| 4,826,057 A | 5/1989 | Yamada | |
| 4,993,731 A | 2/1991 | Fuller | |
| 5,063,764 A | 11/1991 | Amis et al. | |
| 5,365,758 A | 11/1994 | Shieh | |
| 5,368,409 A | 11/1994 | Marzullo et al. | |
| 5,390,571 A | * 2/1995 | Fox et al. .................... | 403/328 |
| 5,443,239 A | 8/1995 | Laporte | |
| 5,465,882 A | 11/1995 | Shinohara | |
| 5,531,140 A | * 7/1996 | Chow .......................... | 403/328 |
| 5,558,260 A | 9/1996 | Reichert | |
| 5,577,854 A | 11/1996 | Jacob et al. | |
| 5,664,715 A | 9/1997 | Gogan et al. | |
| 5,667,232 A | 9/1997 | Gogan et al. | |
| 5,931,360 A | 8/1999 | Reichert | |
| 6,058,747 A | 5/2000 | Doyle et al. | |

OTHER PUBLICATIONS

"Sissy Bars, Racks & Bags", from Hot Rod Bikes, pp. 67–68, Jan. 1996.
Custom Chrome 1994 Catalog, pp. 108–109 and 623–624.
V–Twin 1993 Catalog, p. 511.
Harley–Davidson 1991 Accessories Catalog, p. 72.
Harley–Davidson 1992 Accessories Catalog, pp. 19 and 63.
Harley–Davidson 1993 Accessories Catalog, pp. 20, 25, 28 and 36.
Harley–Davidson 1995 Parts and Accessories Catalog, pp. 19, 41, 60, 63, 72, 73 and 82.

* cited by examiner

Primary Examiner—Gary E. Elkins
(74) Attorney, Agent, or Firm—Michael Best & Friedrich LLP

(57) ABSTRACT

A latching assembly adapted to engage a mounting member. The latching assembly includes a support and a latching member movable mounted on the support for movement between a latched position and an unlatched position. A locking member is mounted for movement relative to the latching member between a locked position and an unlocked position. The locking member is biased toward the locked position. A securing mechanism is coupled with the latching member and is movable between a secured position and an unsecured position. The locking member is adapted to move from the locked position to the unlocked position upon engagement of the locking member with the mounting member, and the latching member is adapted to pivot from the unlatched position to the latched position upon engagement of the locking member with the mounting member.

6 Claims, 9 Drawing Sheets

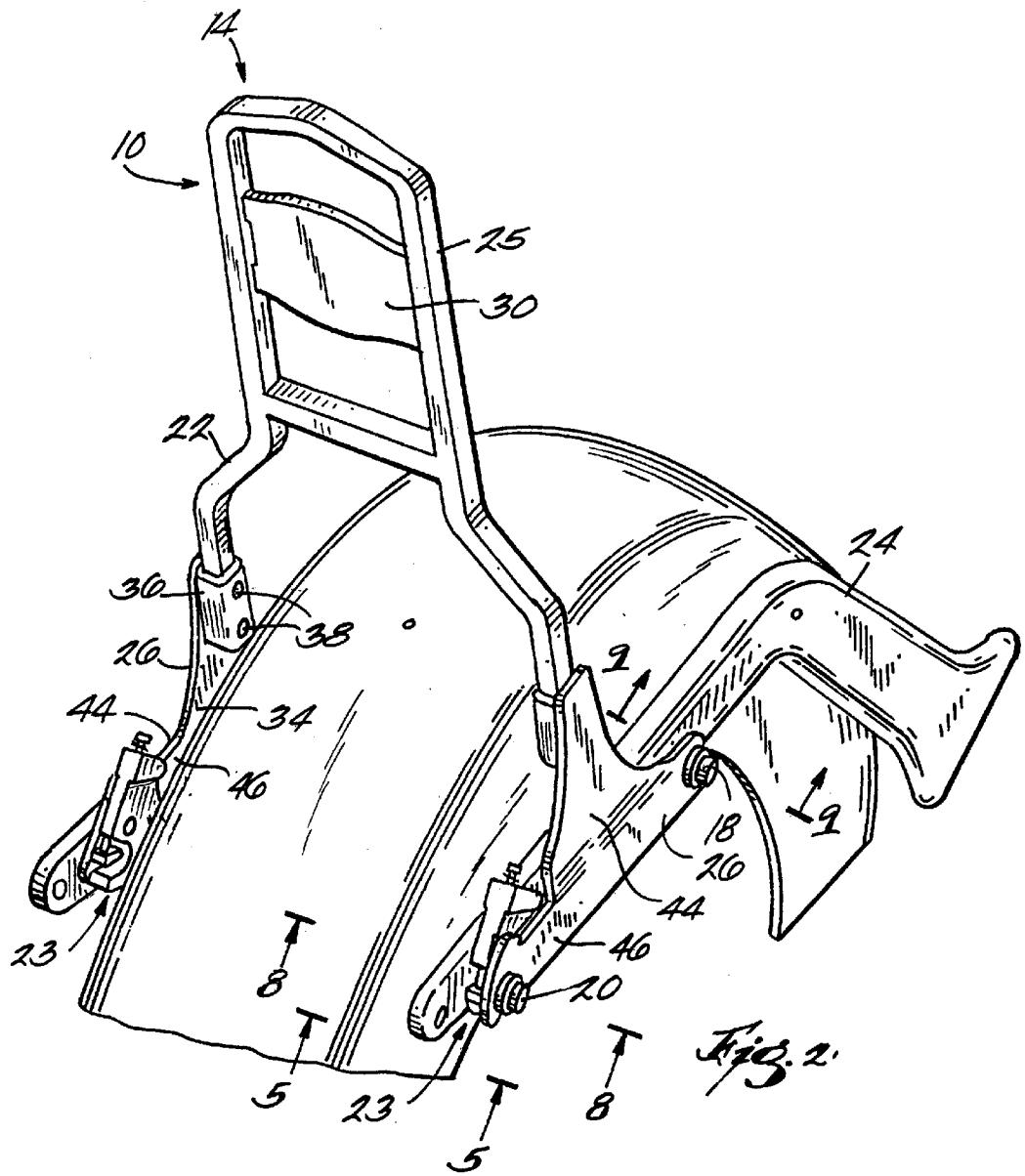

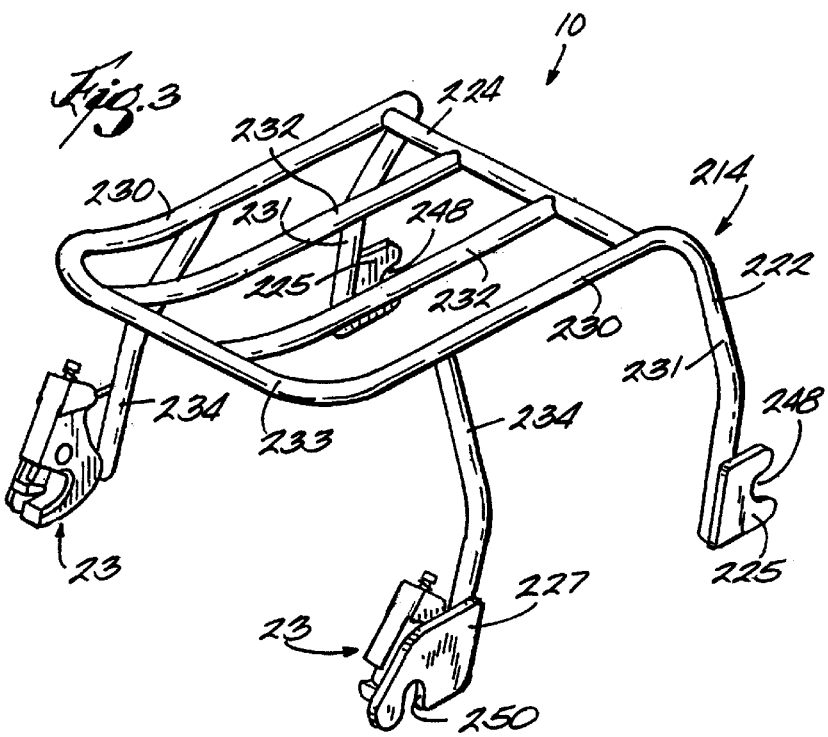
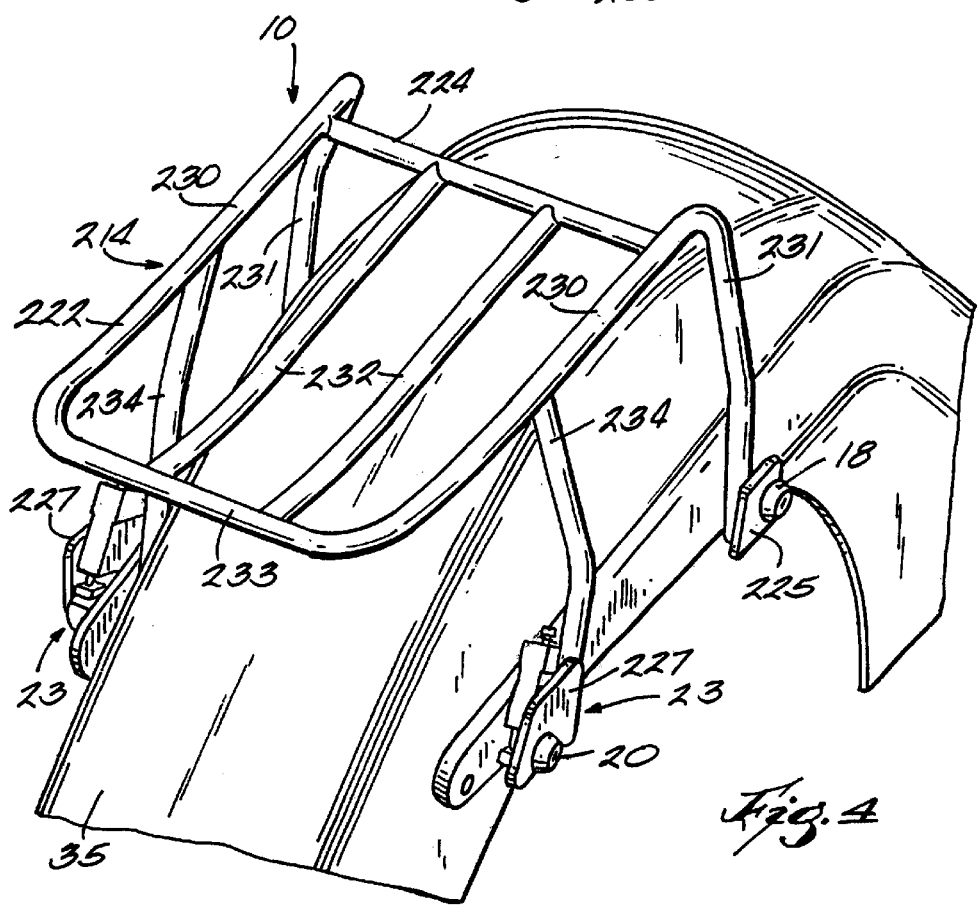

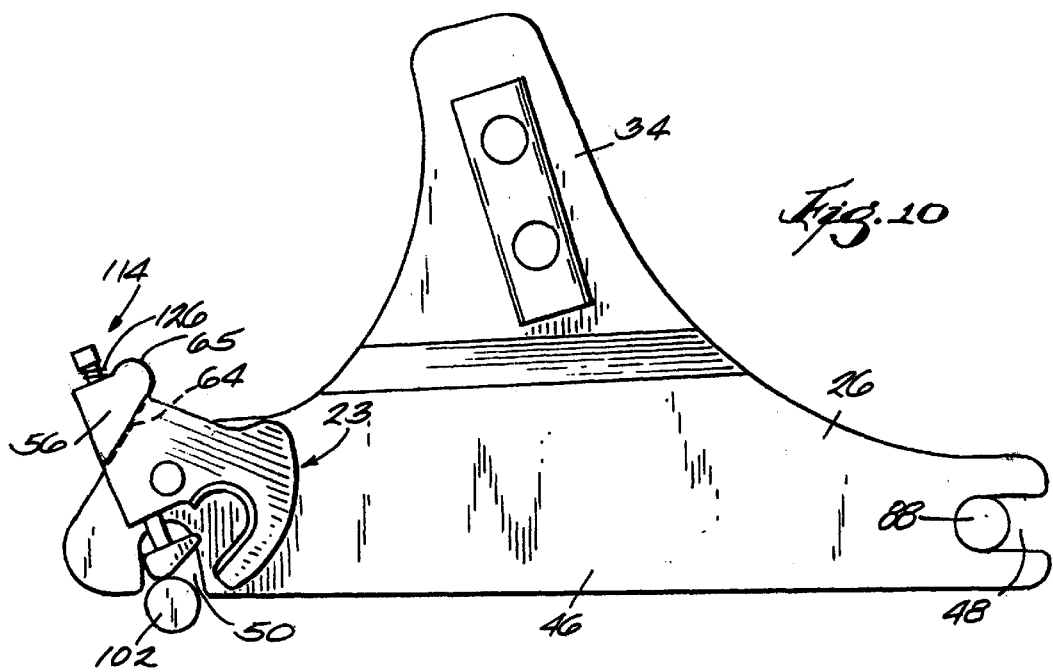
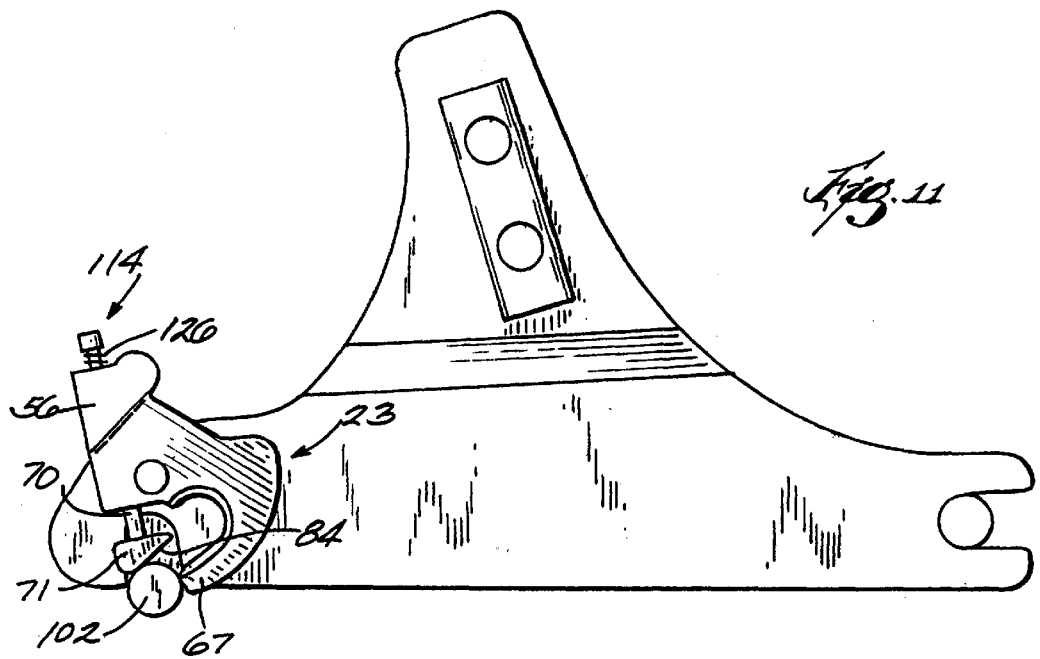

US 6,729,515 B2

LATCHING ASSEMBLY

CROSS-REFERENCE TO RELATED APPLICATIONS

This application is a continuation application of U.S. application Ser. No. 09/572,735, filed May 17, 2000, now U.S. Pat. No. 6,443,344 the entire contents of which are herein incorporated by reference.

FIELD OF THE INVENTION

The present invention relates to the field of detachable components (e.g., backrests and luggage carriers) for motor vehicles (e.g., motorcycles). More specifically, the present invention relates to a latching assembly for a detachable component.

BACKGROUND OF THE INVENTION

The use of detachable luggage carriers and backrests (also known as sissy bars) is known. U.S. Pat. Nos. 5,664,715 and 5,667,232 to Gogan et al. illustrate the use of such detachable luggage racks and sissy bars. The simple method of attaching and detaching these luggage carriers and sissy bars is highly advantageous over the older, more burdensome devices. However, the detachable components suffer from one disadvantage. The quick and easy detachability of these components makes them easier to steal, and therefore more likely to be stolen.

SUMMARY OF THE INVENTION

The present invention solves the above-noted problem by providing a detachable component that can be locked into place on the motorcycle, thereby preventing the detachable component from being stolen. The detachable component of the present invention generally includes a latching member mounted on the detachable component for automatically attaching the detachable component to the mounting members, and a securing mechanism (e.g., a keyed lock) coupled with the latching member for securing the latching member in a locked position. In the locked position, the detachable component cannot be detached from the motorcycle.

The detachable component is adapted to be removably installed on a motorcycle having a first mounting member and a second mounting member. The detachable component includes a frame portion, at least one latching support connected to the frame portion, and a latching member movably (e.g., pivotably) coupled to the latching support. The latching member is movable between a latched position, where the latching support is secured to the second mounting member, and an unlatched position. The detachable component further includes a locking member movable relative to the latching member, and movable between a locked position, where the latching member is held in the latched position, and an unlocked position. A securing mechanism (e.g., a keyed lock) is coupled with the latching member, and is movable between a secured position and an unsecured position. The locking member is prohibited from moving from the locked position to the unlocked position by the securing mechanism in the secured position. By virtue of the provision of the securing mechanism, the above-described latching member cannot be moved from the latched position until the securing mechanism is moved to the unsecured position thereby inhibiting theft of the detachable component.

In one embodiment, the securing mechanism is manually movable from the unsecured position to the secured position. For example, the securing mechanism can include a tubular key lock having a piston biased in the unsecured position and manually movable to the secured position. A key is used to move the securing mechanism from the secured position to the unsecured position.

Other features and advantages of the invention will become apparent to those skilled in the art upon review of the following detailed description, claims, and drawings.

BRIEF DESCRIPTION OF THE DRAWINGS

FIG. 2 is an enlarged perspective view of the sissy bar assembly illustrated in FIG. 1.

FIG. 3 is a perspective view of a luggage carrier assembly embodying the present invention.

FIG. 4 is a perspective view of the luggage carrier assembly illustrated in FIG. 3 mounted on a motorcycle.

FIG. 9 is a section view of a front mount taken along line 9—9 in FIGS. 2 and 4.

FIGS. 10–15 illustrate the operation of the latch as it is moved from an unlatched position to a latched and secured position.

Figure 1:
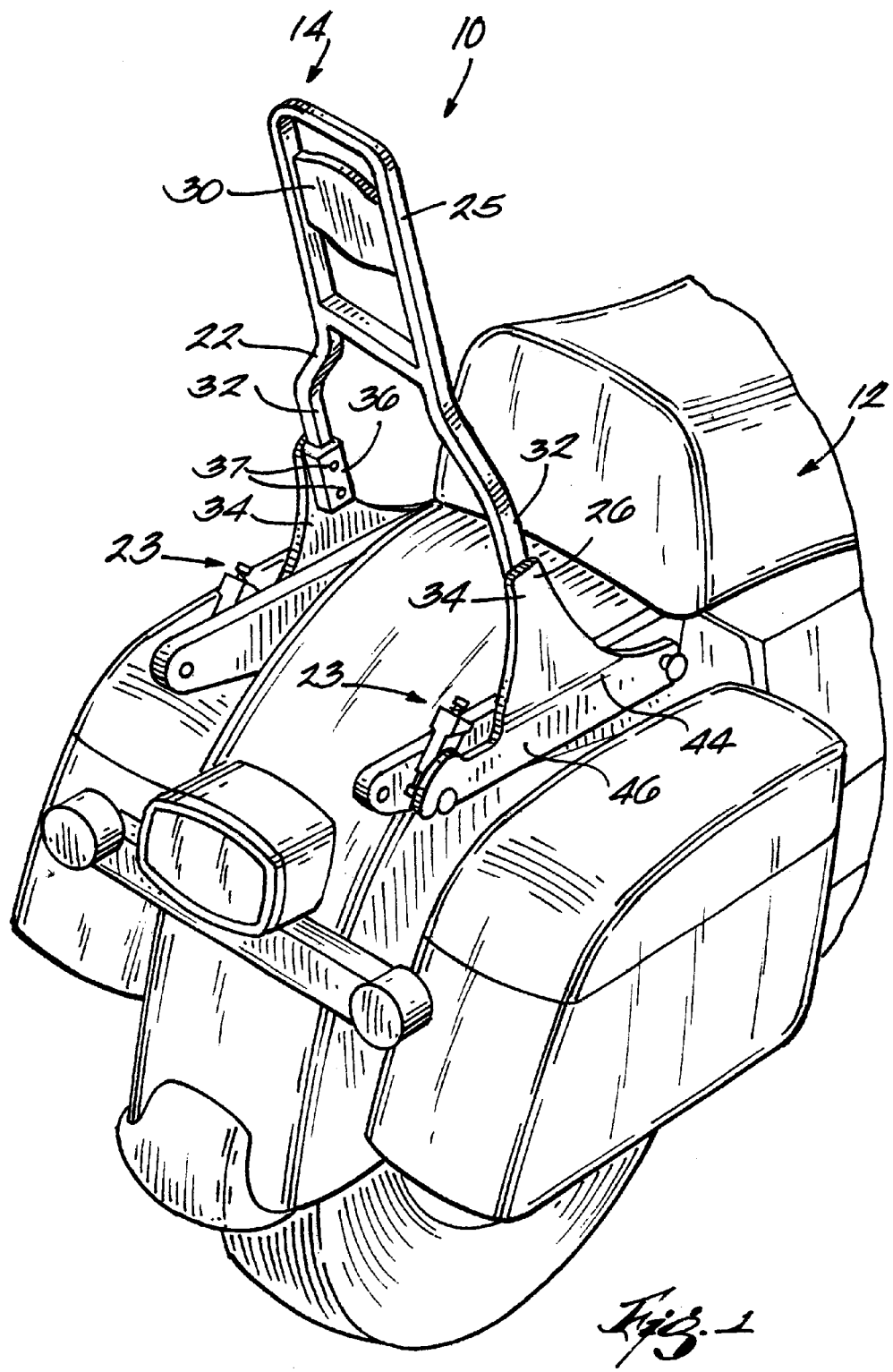
FIG. 1 is a perspective view of a motorcycle having a sissy bar assembly embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIGS. 1–4 illustrate a detachable component assembly 10 embodying the present invention. FIGS. 1–2 illustrate the detachable component assembly 10, wherein the detachable component is a sissy bar assembly 14 adapted to be installed on a motorcycle 12 having front and rear mounting members 18 and 20 for releaseably supporting a sissy bar. The sissy bar assembly 14 is described in U.S. Pat. No. 5,667,232 issued Sep. 16, 1997, which is hereby incorporated by reference. The sissy bar assembly 14 includes a sissy bar 22 and latching assemblies 23 mounted on each of the lateral sides of the sissy bar 22 for automatically securing the sissy bar 22 to the mounting members 18 and 20 extending from the motorcycle frame 24, upon pivotal movement of the sissy bar 22 about the front mounting member 18 and toward the rear mounting member 20. As used herein, the term "automatically" means that the latching assembly 23 is designed such that the sissy bar 22 need only be pivoted toward the rear mounting member 20 in order to cause the latching assemblies 23 to engage. That is, there is no need to manually move or release the latching assemblies 23 in order to secure the sissy bar 22 to the mounting members 18 and 20.

The illustrated sissy bar 22 includes a sissy bar member 25 and a base or frame portion in the form of side plates 26 for supporting the sissy bar member 25. The illustrated sissy bar member 25 includes a back support portion 30 and two leg portions 32 extend downwardly from the support portion 30 for securing the sissy bar member 25 to the side plates 26.

Each of the side plates 26 includes an upper portion 34 having a mounting bracket 36 for receiving a leg portion 32 of the sissy bar member 25. The leg portions 32 may be secured in brackets 32 in any suitable manner, such as screws 37 which pass through openings 38 in bracket 36 and are threadably received in aligned threaded holes in the corresponding leg portions 32.

The side plates 26 each further include an intermediate portion 44 extending downwardly and obliquely outwardly from a lower edge of the upper portion 34. The intermediate portions 44 provide a desired offset to accommodate the latching assemblies 23, as described below in more detail.

Figure 8:
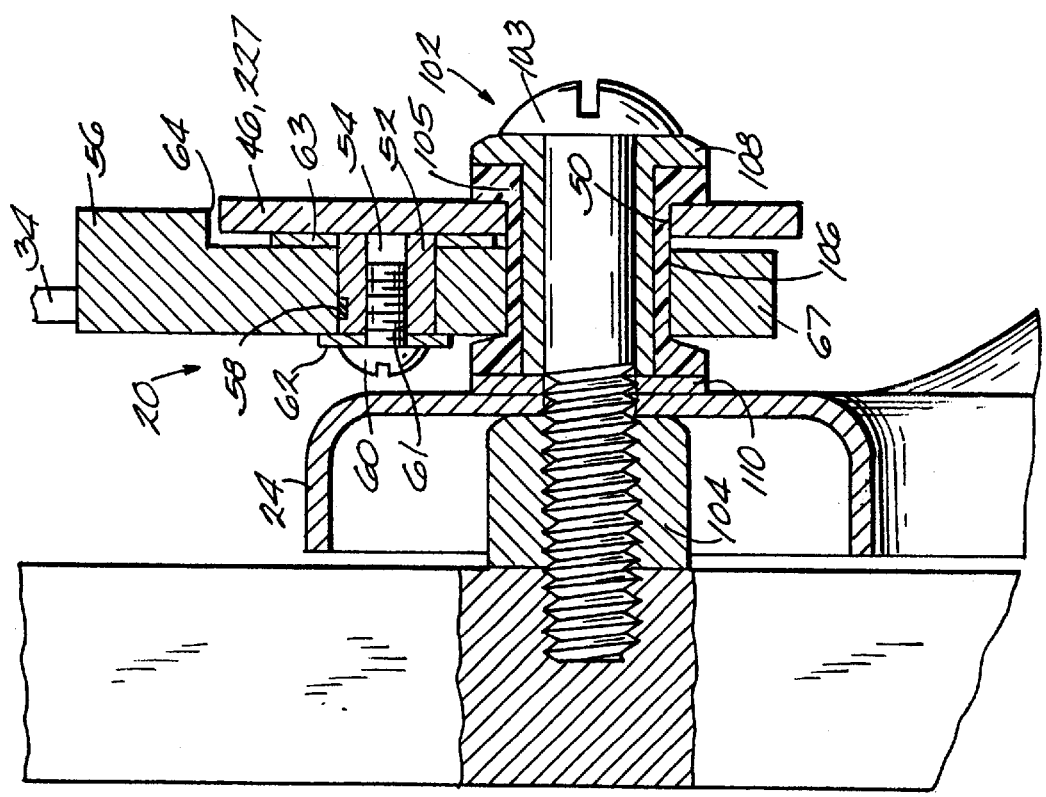
FIG. 8 is a section view of the right side latch taken along line 8—8 in FIGS. 2 and 4.
Figure 12:
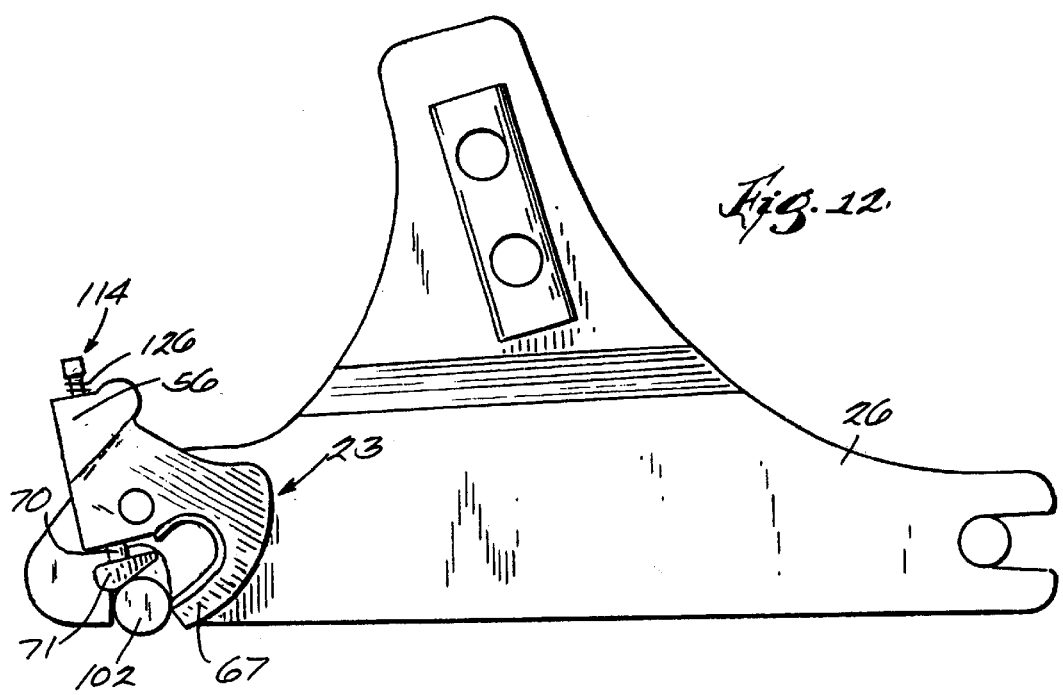
Figure 13:
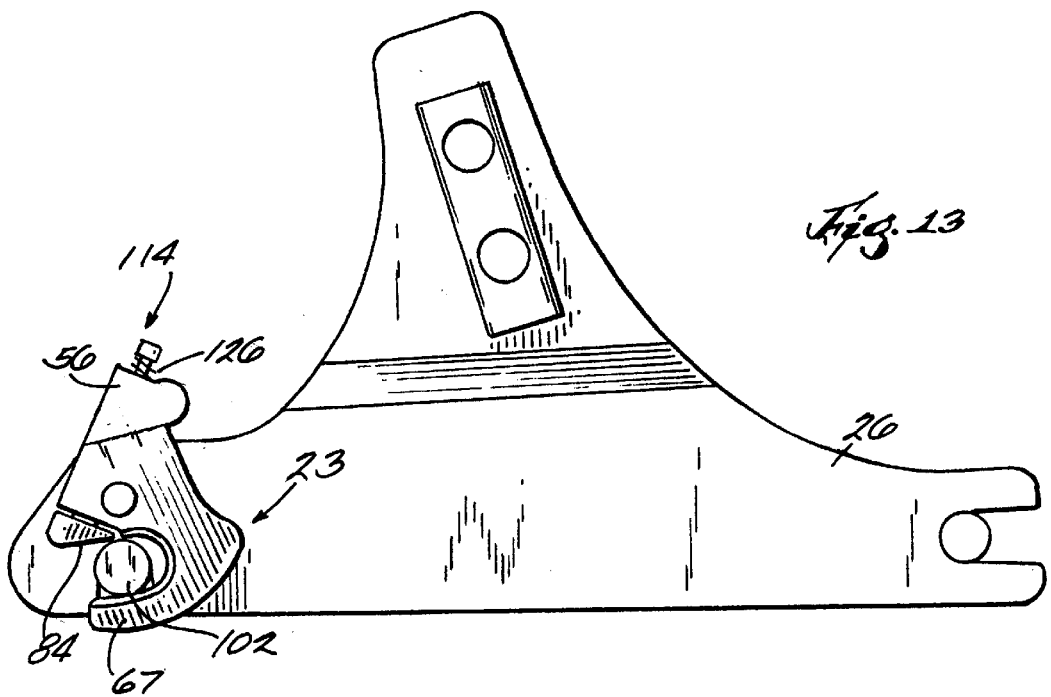

Lower portions 46 of the side plates 26 extend downwardly from the lower edge of each intermediate portion 44 and each is generally vertically oriented relative to the motorcycle frame portion 24. As best seen in FIG. 10, a forwardly-facing, C-shaped recess 48 is formed on the front end of the lower portion 46 and a downwardly-facing, inverted U-shaped rear recess 50 is formed on a rear thereof. Referring to FIG. 8, a cylindrical pivot member 52 is secured to and extends laterally inwardly from each lower portion 46, and each has a cylindrical outer surface for pivotally supporting a latching assembly 23, as described below.

FIGS. 3–4 illustrate the detachable component assembly 10, wherein the detachable component is a luggage carrier assembly 214 adapted to be installed on a motorcycle having front and rear mounting members 18 and 20 for releaseably supporting a luggage carrier. Like reference numerals indicate like parts. The luggage carrier assembly 214 is described in U.S. Pat. No. 5,664,715 issued Sep. 9, 1997, which is hereby incorporated by reference. The luggage carrier assembly 214 includes a luggage carrier 222 and latching assemblies 23 mounted on each of the lateral sides of the luggage carrier 222 for automatically securing the luggage carrier 222 to the rear mounting member 20 upon pivotal movement of the luggage carrier 222 about the front mounting member 18 and toward the rear mounting member 20. As used herein, the term "automatically" means that the latching assembly 23 is designed such that the luggage carrier 222 need only be pivoted toward the rear mounting member 20 in order to cause the latching assembly 23 to engage. That is, there is no need to manually move or release the latching assembly 23 in order to secure the luggage carrier 222 to the rear mounting member 20.

The illustrated luggage carrier 222 includes a luggage rack 224 and a base or frame portion in the form of two front side plates 225 and two rear side plates 227 for supporting the luggage rack 224. The luggage rack 224 may take any convenient form and may include a generally horizontally oriented cargo support portion formed by an outer tube 230 shaped to define a generally U-shaped upper portion and a pair of depending legs 231, a pair of parallel center tubes 232 and an end tube 233 extending between the sides of tube 230. A pair of tubular rear legs 234 extend downwardly from the forward portion of tube 230 for support of the luggage carrier above the motorcycle's rear fender 35.

The side plates 225 and 227 are secured respectively to the lower ends of the legs 231 and 234 in any suitable manner, such as by welding and are generally vertically oriented relative to the motorcycle fender 35. The front side plates 225 each include a forwardly-facing, generally C-shaped front recess 248, and the rear side plates 227 each include a downwardly-facing inverted generally U-shaped rear recess 250. Referring to FIG. 8, a cylindrical pivot member 52 is secured to and extends laterally from an inside surface of each rear side plate 227. The pivot member 52 has a cylindrical outer surface for pivotally supporting the latching assembly 23, as described below.

Figure 7:
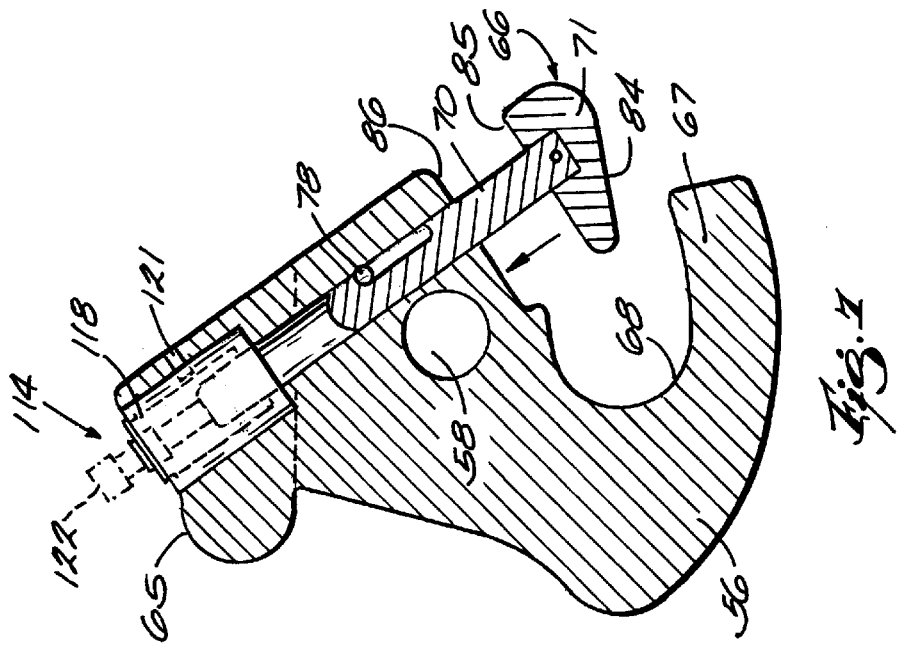
FIG. 7 is a section view of the right side latch taken along line 7—7 in FIG. 5.
Figure 5:
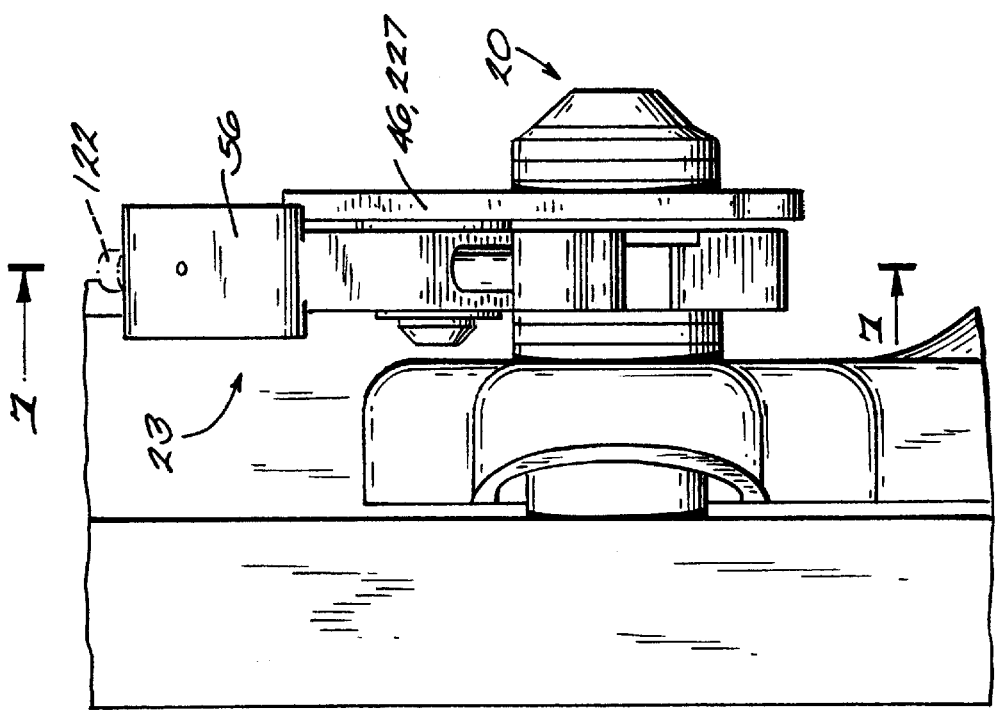
FIG. 5 is an enlarged rear view of a right side latch as viewed from line 5—5 in FIGS. 2 and 4.
Figure 6:
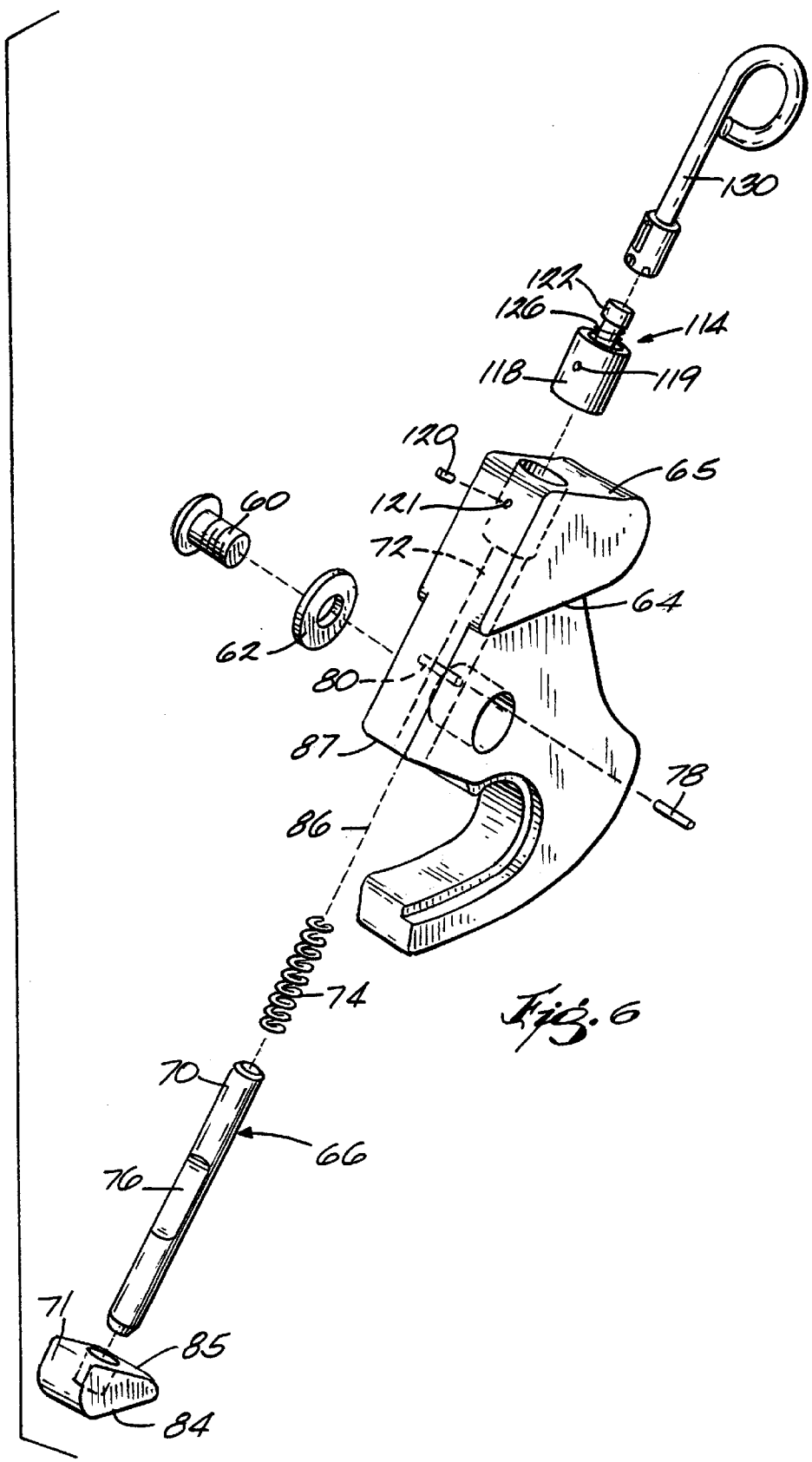
FIG. 6 is an exploded perspective view of the right side latch of FIG. 5.
Figure 7:
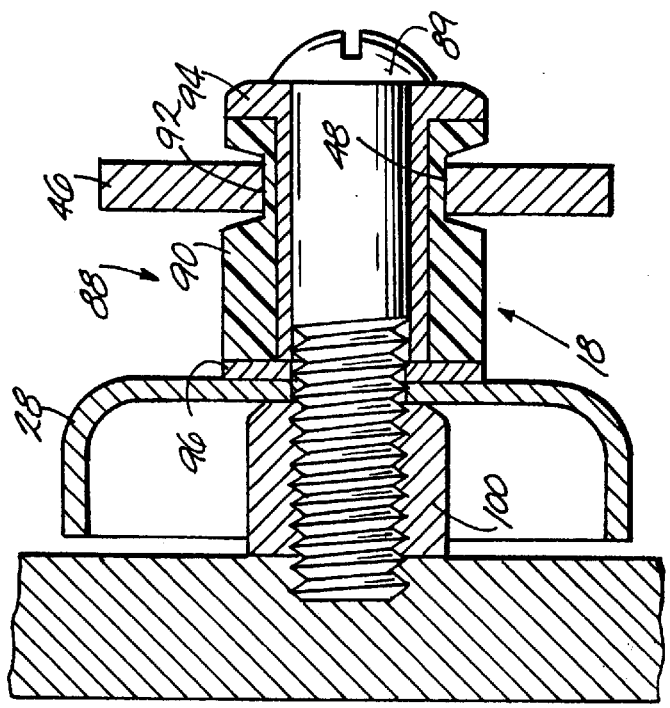

Referring to FIGS. 5–7, each latching assembly 23 includes a latching member 56 pivotally mounted on the rear of the lower portions 46 (for use with sissy bar assembly 14) or the rear side plates 227 (for use with luggage carrier assembly 214) for movement between an unlatched position, in which the lower portions 46 or rear side plates 227 are engageable and disengageable with the rear mounting member 20, and a latched position, in which the lower portions 46 or rear side plates 227 are held in engagement therewith. Each latching assembly 23 further includes a locking device 66 movable relative to the latching member 56 between an unlocked position, in which the latching member 56 is movable between its latched and unlatched positions, and a locked position, in which the latching member 56 is held in its latched position.

The latching member 56 has a pivot opening 58 complementary to the mounting member 52 on the corresponding lower portion 46 or rear side plate 227, and is retained thereon by a screw 60 threaded into a threaded axial bore 61 in member 52 and a washer 62. A spring washer 63 may be positioned between each latching member 56 and the lower portion 46 or rear side plate 227 respectively. As seen in FIG. 6, each latching member 56 includes an overhanging lip 64 that interacts with the corresponding lower portion 46 or rear side plate 227 to limit rotation of the latching member 56 in both directions. A manually engageable portion 65 may be provided to facilitate engagement of the latching member 56 by the user. Each latching member 56 further includes a hook portion 67 having a C-shaped latching surface 68 for latching the mounting member 20 within the rear recess 50, as will be described below.

Each locking device 66 includes a rod-like plunger member 70 and a cam member 71 suitably fixed to one end of member 70. The other end of plunger 70 is received for axial movement within a bore 72 formed in the latching member 56 and on the side of pivot opening 58 opposite the latching surface 68. A biasing spring 74 is positioned between the end of the plunger member 70 and the end of a lock housing 118 to bias the plunger member 70 outwardly. In the illustrated embodiment, the biasing spring 74 comprises a coil compression spring. The plunger member 70 includes the flattened keyway 76 designed to engage a pin 78 that laterally protrudes through a lateral opening 80 in bore 72 in the latching member 56. The interaction between the pin 78 and the keyway 76 prevents the plunger member 70 from exiting the bore 72.

The cam member 71 includes a cam surface 84 formed on its lower surface and at an oblique angle relative to a longitudinal axis 86 of the plunger member 70. The camming surface is designed to engage a mounting boss on the motorcycle frame portion 24 thereby rotating the latching member 56 about pivot member 52 and to a latched position, as described below in greater detail. The upper surface 85 of cam member 71 is generally planer and is complementary to a planer surface 87 formed in the forward end of latching member 56.

Each latching member 56 also includes a securing mechanism, preferably in the form of a tubular key lock 114 mounted near the manually engageable portion 65. The tubular key lock 114 of the preferred embodiment can be obtained from Kryptonite Corporation of Canton, Ma. As seen in FIGS. 6 and 7, the tubular key lock 114 includes a lock housing 118 and a piston 122 received in the housing 118. The lock housing 118 is secured in the latching member 56 with a pin 120, which is inserted into a lateral opening 121 in the latching member 56 and received in an opening 119 in the lock housing 118. The piston 122 is substantially co-axial with the plunger 70 and can extend through the housing 118 and into the bore 72. A biasing member in the form of a compression spring 126 is positioned between the end of the piston 122 and the housing 118 to bias the piston 122 outwardly as shown in FIGS. 10–13 and in phantom in FIG. 7. This is known as the unsecured position. The piston 122 can be manually depressed (see FIGS. 7 and 14) toward the housing 118 until it locks and remains substantially within the housing 118 and bore 72. This is known as the secured position. When in the secured position, the piston extends into the bore 72 such that the plunger 70 cannot substantially move axially into the bore 72. Since the plunger 70 cannot enter the bore 72, the plunger 70 and cam member 71 cannot be retracted enough to remove the latching member 56 from the rear mounting member 20.

A key 130 must be used to move the securing mechanism from the secured position to the unsecured position. An end of the key 130 is inserted into the housing 118, which is adapted to receive the end of the key 130 over the piston 122. When the key is rotated, the piston 122 is released from the secured position and the biasing spring 126 moves the piston 122 outwardly to the unsecured position. When biased outwardly, the piston 122 does not extend into the bore 72 and the plunger 70 can move freely throughout the range of motion available in bore 72. As such, the plunger 70 and cam member 71 can be sufficiently retracted to permit removal of the latching member 56 from the rear mounting member 20.

The recesses 48 and 50 in the front and rear ends of lower portion 46 or side plates 225, 227 are positioned to respectively engage mounting members 18 and 20 positioned in a spaced apart relation in any suitable portion of the motorcycle, such as the frame portion 24. More specifically, referring to FIG. 9, the illustrated mounting members 18 include two front mounting bosses 88 each constructed and arranged to receive a corresponding front recess 48. Each front mounting boss 88 includes a threaded stud 89 and a surrounding sleeve 90 made from any suitable polymer material, such as Delrin. The sleeve 90 includes a reduced diameter neck portion 92 for receiving the front recess 48. A metallic bushing 94 is positioned between the front sleeve 90 and the stud 89. A washer 96 is positioned between the end of the sleeve 90 and the motorcycle frame portion 24. The stud 89 may be secured to the motorcycle frame 24 portion in any suitable manner such as by a nut 100.

The illustrated mounting members 20 include two rear mounting bosses 102 designed to accommodate rear recesses 50 and corresponding latch assemblies 23, as shown in FIG. 8. Each rear mounting boss 102 includes a threaded stud 103 which is secured to the frame portion 24 by a nut 104. A sleeve 105 surrounds the stud 103 and may also be formed of any suitable polymer material, such as Delrin. The sleeve 105 includes a reduced diameter neck portion 106 for receiving the rear recess 50 and the corresponding latching assembly 23. A bushing 108 is positioned between the sleeve 104 and the stud 103, and a washer 110 is positioned between the end of sleeve 104 and the motorcycle frame 24.

FIGS. 10–14 illustrate the manner in which the above-described detachable component assembly 10 is mounted onto front and rear mounting bosses 88, 102 of a motorcycle. Both the sissy bar assembly 14 and the luggage carrier assembly 214 are mounted in substantially the same way. As such, only the mounting of the sissy bar assembly 14 is shown. First, the front recesses 48 are engaged with the front mounting bosses 88. With the front recesses 48 fully sealed into the front mounting boss 88, the rear recesses 50 will be aligned with the rear mounting bosses 102, as illustrated in FIG. 10. The latching members 56 are then positioned by pulling back on the engaging portions 65 until the lips 64 contact the lower portions 46 (or rear side plates 227 in the case of the luggage carrier assembly 214).

Next, the assembly is pivoted downwardly about the front mounting bosses 88 until the cam surfaces 84 of the cam members 71 contact the rear mounting bosses 102. The reaction force of spring 74 creates clockwise moments on latching members 56 which rotates until the leading edge of hook portion 67 engages the rear mounting boss 102. Subsequent downward movement of the lower portions 46 results in compression of the spring 74 until the planer surface 85 of the cam member 71 engages the surface 87 on latching member 56. At this point, the cam surface 84 forms a continuation of the latch surface 68 so that the latching member is free for further clockwise rotation under the influence of compression of spring 74. Further downward movement of the lower portion 46 causes further clockwise rotation of the latching member 56 until the hook portion 67 is below the rear mounting boss 102 and the cam surface 84 no longer contacts the rear mounting boss 102. At this point, the plunger member 70 is forced back to its fully-extended position under the influence of the biasing spring 74.

Figure 14:
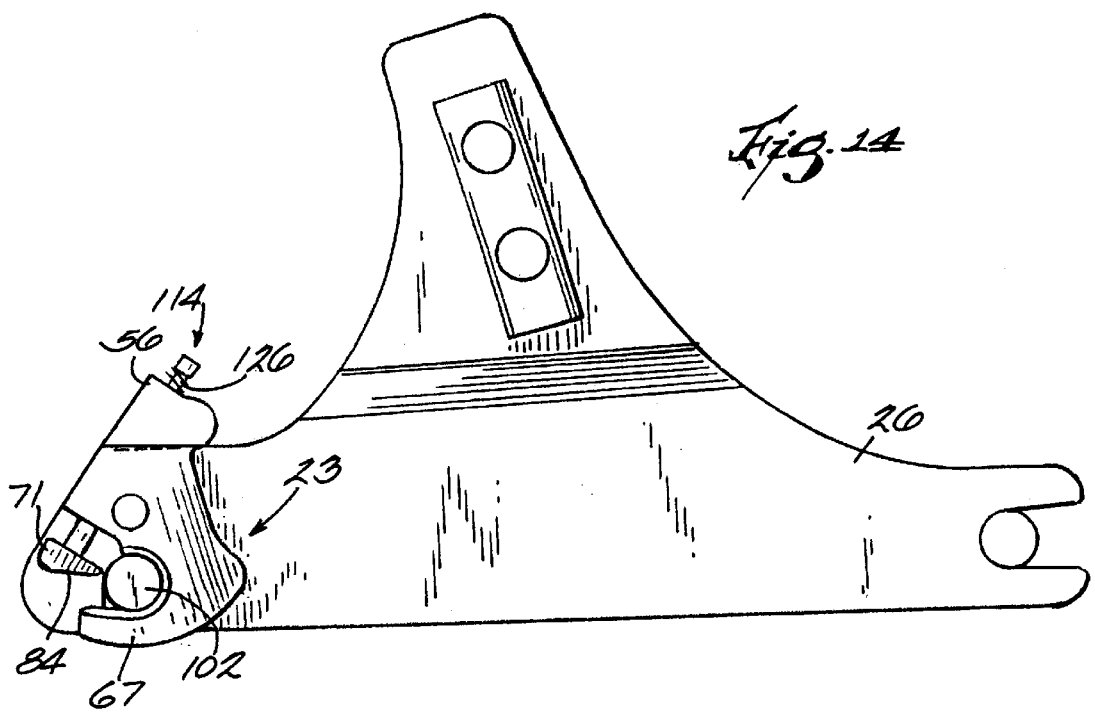
Figure 15:
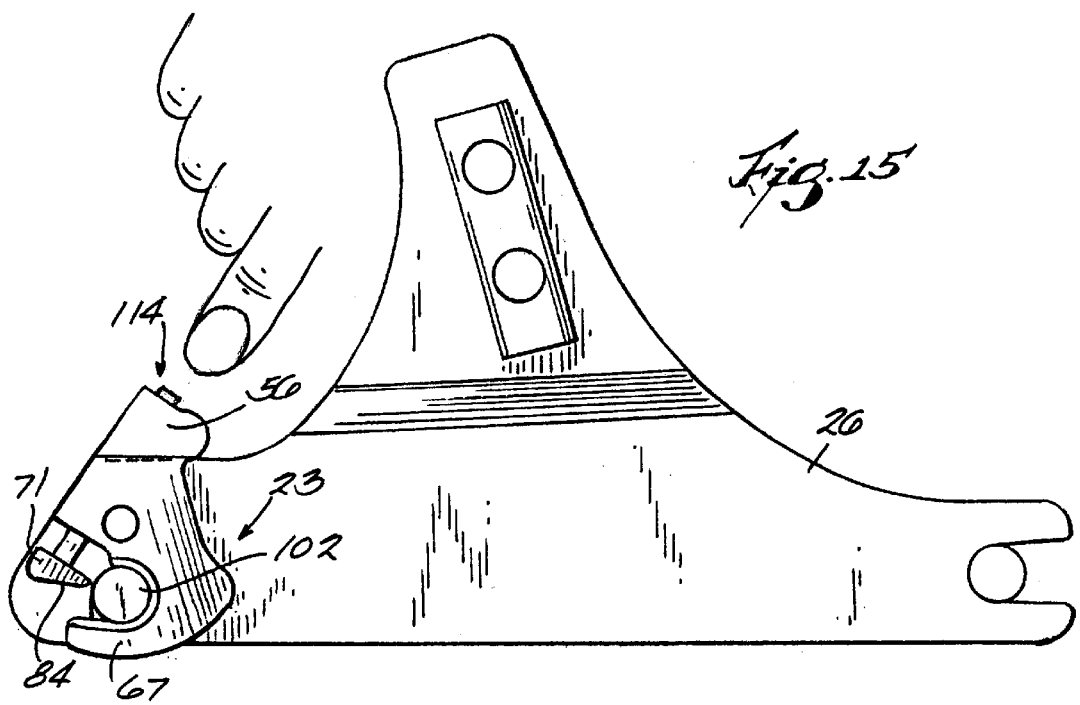

With the latching member 56 positioned on the rear mounting boss 102 as illustrated in FIG. 14, it can be seen that the latching member 56 is prevented from rotating counter clockwise due to the interference between the cam member 71 and the rear mounting boss 102. Accordingly, the side plates 26 are rigidly secured to the mounting bosses. The securing mechanism 114 can be used to insure that the detachable component assembly 10 cannot be removed without the key 130. Simply depressing the piston 122 by hand until the piston 122 is locked substantially within the housing 118 secures the detachable component assembly 10 to the motorcycle.

To remove the detachable component assembly 10 from the motorcycle, the key 130 is inserted into the housing 118 and rotated until the piston 122 is unlocked and returns to the unsecured position. Next, the cam members 71 are moved upwardly until each engages one of the surfaces 87 and the latching members 56 are subsequently rotated counter clockwise until the hook portion 67 on the latching members 56 no longer interfere with removal of the side plates 26 from the rear mounting boss 102.

The securing mechanism 114 substantially maintains the quickness and simplicity with which the detachable component is attached or detached, yet substantially inhibits the theft of the detachable component.

Various features of the invention are set forth in the following claims.

What is claimed is:

1. A latching assembly adapted to engage a mounting member, the latching assembly comprising:

a support;

a latching member movably mounted on the support for movement between a latched position, where the latching member is securable to the mounting member, and an unlatched position;

a locking member carried by the latching member and mounted for movement relative to the latching member between a locked position, where the latching member is securable in the latched position, and an unlocked position, the locking member being biased toward the locked position; and a securing mechanism carried by the latching member and movable between a secured position and an unsecured position, wherein the locking member is prohibited from moving from the locked position to the unlocked position by the securing mechanism in the secured position, the locking member being adapted to move from the locked position to the unlocked position upon engagement of the locking member with the mounting member, the latching member being adapted to pivot from the unlatched position to the latched position upon engagement of the locking member with the mounting member, and wherein the locking member is movable into the locked position without the securing mechanism being moved into the secured position, and wherein the securing mechanism is movable into the unsecured position without the locking member being moved into the unlocked position.

2. The latching assembly of claim 1, wherein the securing mechanism is manually movable from the unsecured position to the secured position.

3. The latching assembly of claim 2, wherein the securing mechanism includes a piston biased in the unsecured position and manually movable to the secured position.

4. The latching assembly of claim 3, wherein the locking member includes a plunger member that is movable substantially parallel to the piston.

5. The latching assembly of claim 1, wherein the securing mechanism includes a tubular key lock.

6. The latching assembly of claim 5, wherein the securing mechanism includes a keyed receptacle adapted to receive a key.

* * * * *